Oct. 13, 1959 E. C. BUNNELL 2,908,318
APPARATUS FOR FORMING THREADS IN SHEET METAL SHELLS
Filed Aug. 12, 1957 7 Sheets-Sheet 3

Fig. 3.

INVENTOR
Earl C. Bunnell
BY
Wooster & Davis
ATTORNEYS.

Oct. 13, 1959     E. C. BUNNELL     2,908,318
APPARATUS FOR FORMING THREADS IN SHEET METAL SHELLS
Filed Aug. 12, 1957     7 Sheets-Sheet 6

INVENTOR
Earl C. Bunnell
BY
Wooster & Davis
ATTORNEYS.

Oct. 13, 1959 E. C. BUNNELL 2,908,318
APPARATUS FOR FORMING THREADS IN SHEET METAL SHELLS
Filed Aug. 12, 1957 7 Sheets-Sheet 7

INVENTOR
Earl C. Bunnell
BY
Wooster & Davis
ATTORNEYS.

United States Patent Office 2,908,318
Patented Oct. 13, 1959

2,908,318

APPARATUS FOR FORMING THREADS IN SHEET METAL SHELLS

Earl C. Bunnell, Stratford, Conn., assignor to The Baird Machine Company, Stratford, Conn., a corporation of Connecticut Application August 12, 1957, Serial No. 677,573

10 Claims. (Cl. 153—72)

This invention relates to an apparatus for forming threads in sheet metal shells, such, for example, as screw shells for electric lamp bulbs, screw caps for cans, bottles and so forth, and similar articles of drawn or formed sheet metal.

It has for an object to provide an improved automatic means for rolling a screw thread in the side walls of these shells and then removing the threaded shells from the thread-forming means.

It is another object to provide a device of this character which may be applied directly to a machine for making the unthreaded shells, such, for example, as the eyelet type of machine, so that if desired the shells may be formed and threaded as a continuous operation.

It has been determined from experience that the most perfect screw shell is made where a full size mandrel has been used for the threading operation, which necessitates the unscrewing of the finished shell from the mandrel, and which requires considerable time to accomplish. It is therefore a further object of the invention to provide an apparatus which has means for the production of a thread alternately on shells on each of two mandrels, with means for unscrewing the finished shell from its mandrel during the time the threading is being done on the other mandrel. This allows production of the threaded parts at a rate comparable to the speed of the parent machine for making the unthreaded parts which would normally be much faster than if time were required to both thread the part and unscrew it from the mandrel within a single cycle of the machine.

With the foregoing and other objects in view, I have devised the construction illustrated in the accompanying drawings forming a part of this specification. It is, however, to be understood the invention is not limited to the specific details of construction and arrangement shown, but may embody various changes and modifications within the scope of the invention.

The device is shown as applied to a machine for making the shells to be threaded, such, for example, as screw shells for electric lamp bulbs, screw caps for container cans, bottles and the like, and similar articles of drawn or sheet metal. The shell blank making or forming machine, only part of which is shown, is indicated at 1, including a frame 2 and a bed 3 to one end of which frame and bed this device is secured to receive the blanks or unthreaded shells from this machine, the dies and mechanism for forming the unthreaded shells not being shown, as they form no part of the present invention. The machine, for example, is an eyelet type of machine provided with the usual mechanism for stamping the blanks from a sheet metal strip, for example, and then forming or drawing the blanks into a suitable shell, either a cylindrical shell open at its opposite ends, or a cupped shell, for example, closed at one end, the particular shell illustrated in the drawing at 4 being shown as a sheet metal cupped member closed at its lower end as indicated at 5, but it is to be understood this is shown merely by way of example, as other types of shells may be threaded on this machine. The threaded shell is shown at 4a.

This threading mechanism comprises a bracket 6 which may be secured by any suitable means, such, for example, as suitable bolts or screws 7, to the frame 2 of the eyelet type of machine 1, and the mechanism for performing the threading operations is mounted on this bracket. It may thus be separately assembled and applied as a unit to the eyelet type of machine 1.

The device comprises two associated mechanisms, one for feeding the blanks formed by the eyelet type of machine 1 to the thread-forming mechanism, and the other the mechanism for forming the threads in the blanks and automatically removing the threaded blanks from the thread-forming means. The thread-forming means is driven by a separate electric motor 8, and the feed mechanism and control for the thread-forming means are operated from the cam shaft 9 of the blank-forming machine 1. For performing the thread-rolling operations there are two mandrels 10 and 11 for supporting the unthreaded blanks, and two sets of means for rolling the threads in the sides of the shells and removing the threaded shells from the mandrels, which means are operated alternately so that when the thread is being rolled in the blank on one mandrel the threaded shell is being removed from the other mandrel.

Figure 3:
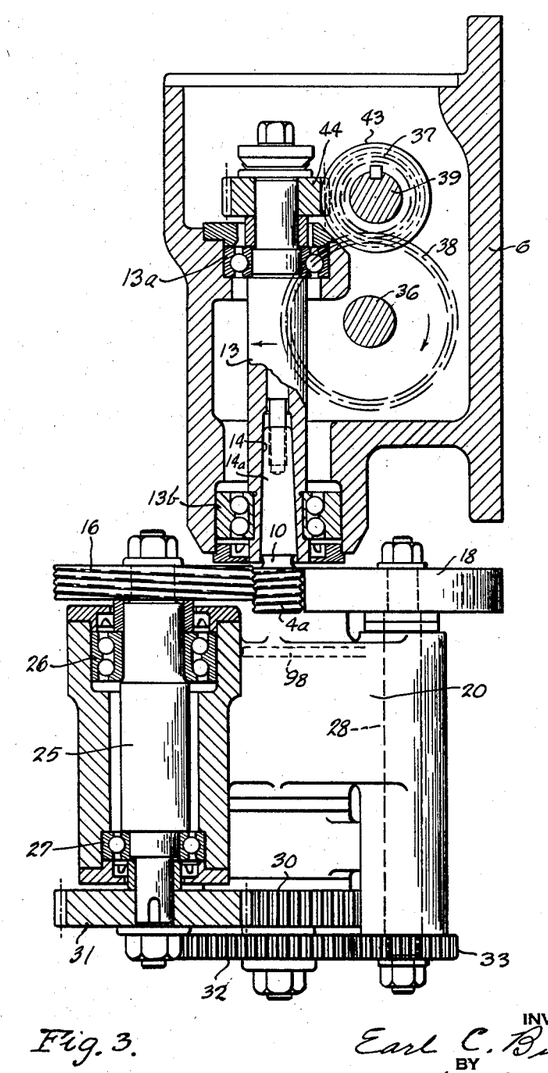
Fig. 3 is a vertical section substantially on line 3—3 of Fig. 1.
Figures 13, 15:
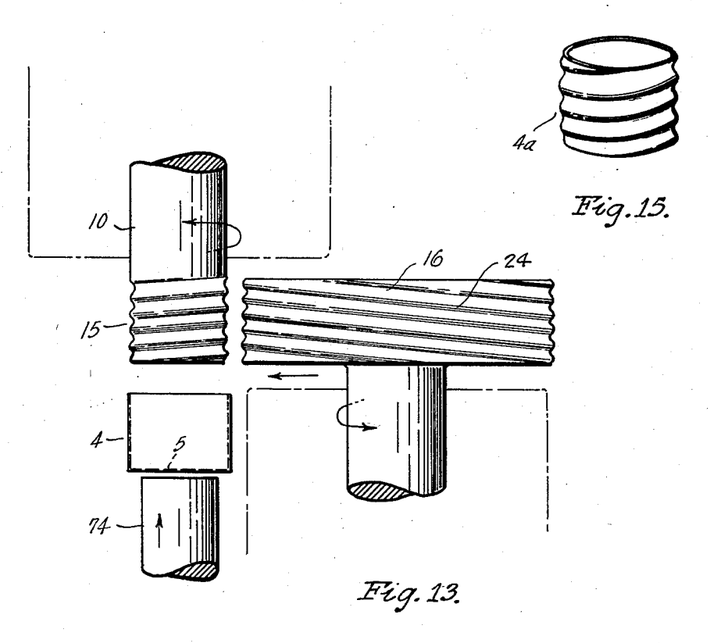
Fig. 13 is a diagrammatic view illustrating part of the operation of feeding a shell to the mandrel for the thread-rolling operation.
Fig. 15 is a perspective view of a threaded shell.
Figure 14:
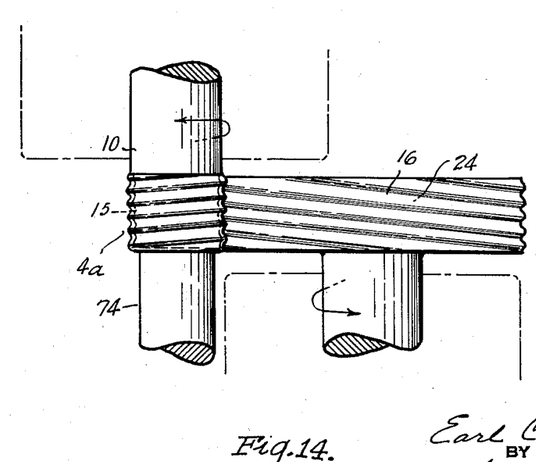
Fig. 14 is a similar view showing the threading operation.

The two mandrels 10 and 11 in the arrangement shown are mounted to rotate about vertical axes in suitable bearings 13a and 13b in the upper portion 12 of the bracket 6 and may include suitable spindles 13 running in these bearings and provided with tapered sockets 14 at their lower ends in which the similarly tapered shanks 14a of the mandrels may be seated and clamped, which arrangement permits the changing of the mandrels for threading different sizes or types of shells. As shown in Fig. 13, the lower end of the mandrel is formed with an external screw thread 15 to correspond with the thread to be formed on the sides of the shell blank 4. Cooperating with each mandrel is a threaded wheel for rolling the thread in the shell on the mandrel, the wheel 16 cooperating with the mandrel 10 and the wheel 17 cooperating with the mandrel 11. Also associated with each mandrel is a friction wheel for unscrewing the threaded shells from the mandrels, such as wheel 18 cooperating with the mandrel 10 and wheel 19 cooperating with the mandrel 11. Wheels 16 and 18 are mounted on a pivoted bracket 20 and located on opposite sides of the mandrel 10, while the wheels 17 and 19 are mounted on a pivoted bracket 21 on opposite sides of the mandrel 11. The bracket 20 is pivotally mounted to swing on a hollow sleeve or stud 22 mounted on the bracket 6, while the bracket 21 is pivotally mounted on a similar hollow sleeve or stud 23 mounted on the bracket 6 to permit the wheels 16 to 19 to be swung toward and from their respective mandrels 10 and 11. The threaded wheels 16 and 17 are provided on their peripheries with screw threads 24 corresponding with the threads 15 on the mandrels for cooperating therewith to roll the corresponding screw threads in the side walls of the shell blank 4. The threaded wheels 16 and 17 are each mounted on a suitable shaft 25 mounted in suitable bearings 26 and 27 in the pivoted brackets 20 and 21 as shown more clearly in Fig. 3, and the friction wheels 18 and 19 are mounted on shafts 28 in similar bearings (not shown) in their respective brackets 20 and 21. Any material having suitable friction for gripping the threaded shells may be used for the wheels 18 and 19. The wheels 16 to 19 are driven through suitable gears from shafts 29. Meshing gears 30 and 31 drive the threaded wheels from the shafts 29, while meshing gears 32 and 33 drive the wheels 18 and 19 from the shafts 29. The shafts 29 are driven by spiral gears 34 and 35 from a shaft 36 in the upper part of the bracket 6 driven by meshing gears 37 and 38 from a shaft 39 driven by the motor 8 through the grooved pulleys 40 and 41 and V-belts 42. The two mandrels 10 and 11 are driven from the shaft 39 through the spiral gears 43 and 44. The gear ratios for driving the mandrels 10 and 11 and threaded wheels 16 and 17 are such as to rotate the mandrel and the associated threaded wheel with the same peripheral speeds for the operation of rolling the thread in the shell blank 4. The friction wheels 18 and 19 are driven at higher speeds for quick removal of the threaded shells from the mandrels.

Figure 1:
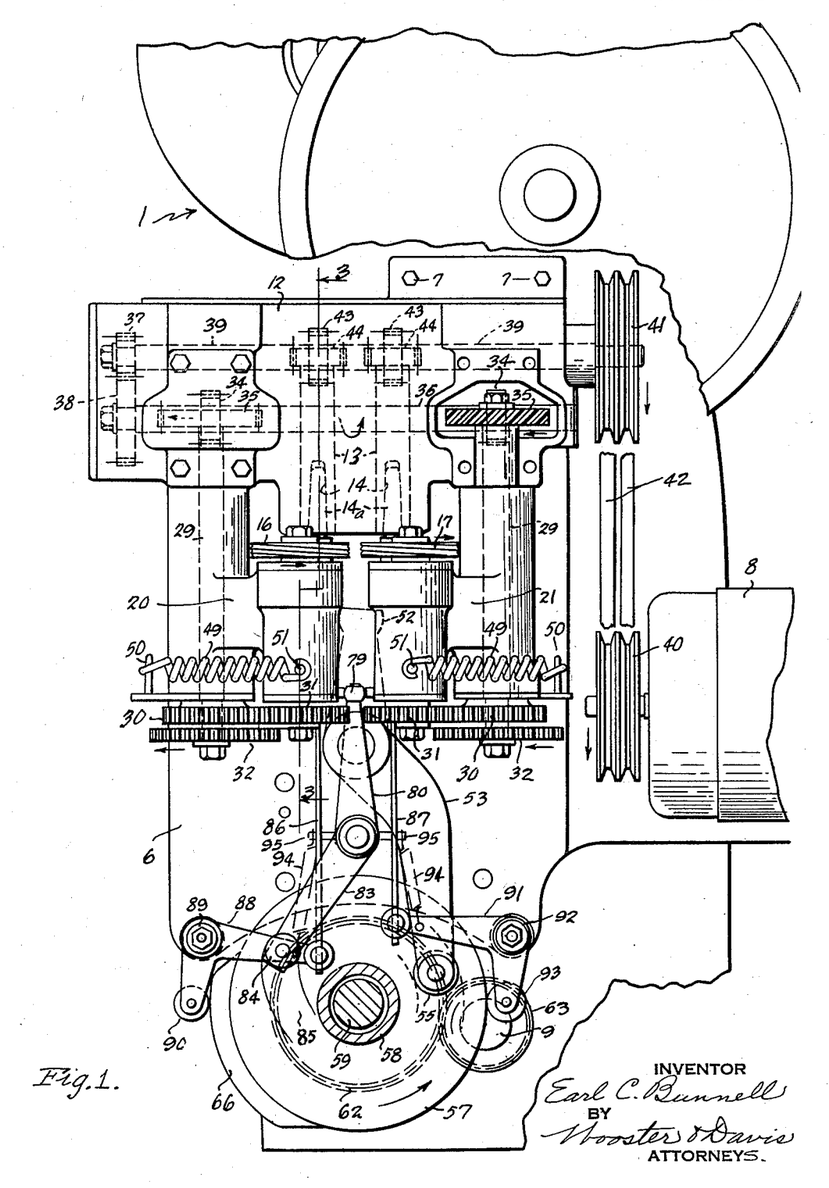
Fig. 1 is a front view of the device showing it applied to a machine for making the unthreaded shells, such as an eyelet type of machine, with parts broken away.
Figure 2:
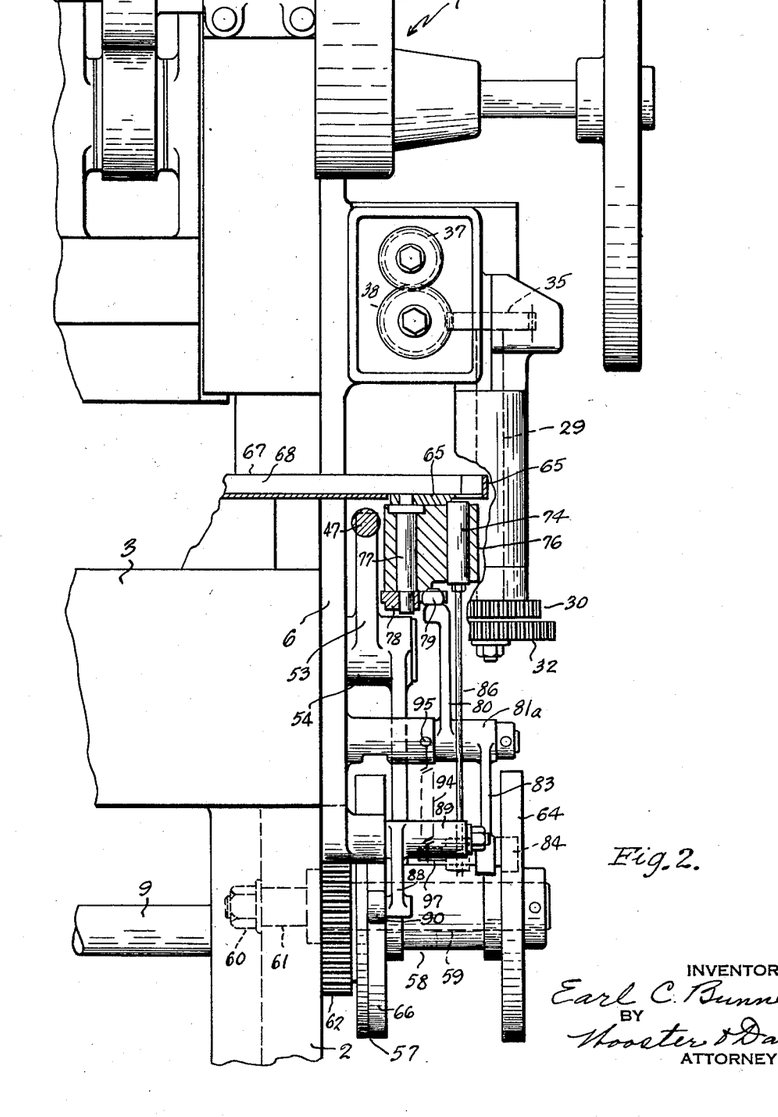
Fig. 2 is a partial section and partial side view looking from the left of Fig. 1.

The two pivoted brackets 20 and 21 are alternately rocked back and forth on their pivots 22 and 23 to swing their respective wheels 16, 18 and 17, 19 to and from engagement with the shell on the respective mandrels 10 and 11. For this purpose each is provided with a laterally extending arm 45 carrying an adjustable abutment screw 46, each engaging the end of a slidable bar 47 mounted to slide in bearings 48 in the bracket 6, and the abutment screws 46 are held against the ends of the bars 47 by suitable coil springs 49 (Fig. 1) each secured at one end to the bracket 6 at 50 and at its other end to a pin 51 on each of the brackets 20 and 21. As these springs are connected to the brackets 20 and 21, in the portion carrying the shaft 25 for threaded wheels 16 and 17, they tend to shift the brackets 21 to swing the threaded wheels away from the mandrels and to swing the friction wheels 18 and 19 toward the mandrels. Between the inner ends of the slidable rods 47 is the upper end 52 of a cam-operated lever 53 pivoted to the frame 6 at 54. The other arm carries a roller 55 running in a cam groove 56 (Fig. 7) in a cam 57 mounted on a sleeve 58 mounted to rotate on suitable antifriction bearings (not shown) on a stud or shaft 59 secured to the frame 2 of the eyelet machine by any suitable means such as the nut 60 (Fig. 2) and reduced end 61. Secured to this sleeve 58 is a gear 62 meshing with and driven by the gear 63 (Fig. 1) on the cam shaft 9 of the eyelet machine, so that this sleeve 58 is driven from this shaft. Also mounted on this sleeve is a cam 64 for operating a transfer device 65 for bringing the unthreaded shells 4 into alignment with the respective mandrels 10 and 11, and on the periphery of the cam 57 is a cam 66 for transferring the blank shells from the transfer device to the respective mandrels.

Figures 4, 5:
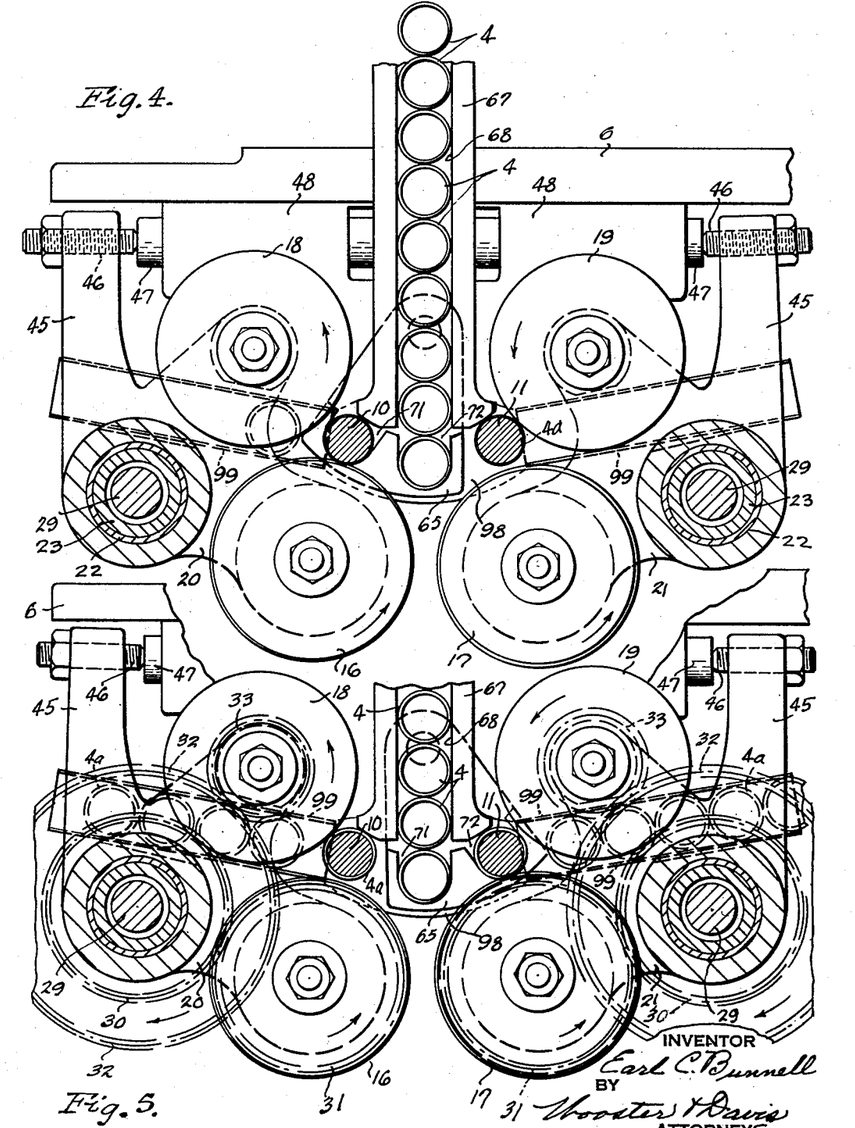
Fig. 4 is a partial top plan view and partial section of the thread-rolling and threaded shell removing means showing the parts in one position.
Fig. 5 is a similar view showing the parts in an alternate position.
Figures 9, 10, 11, 12:
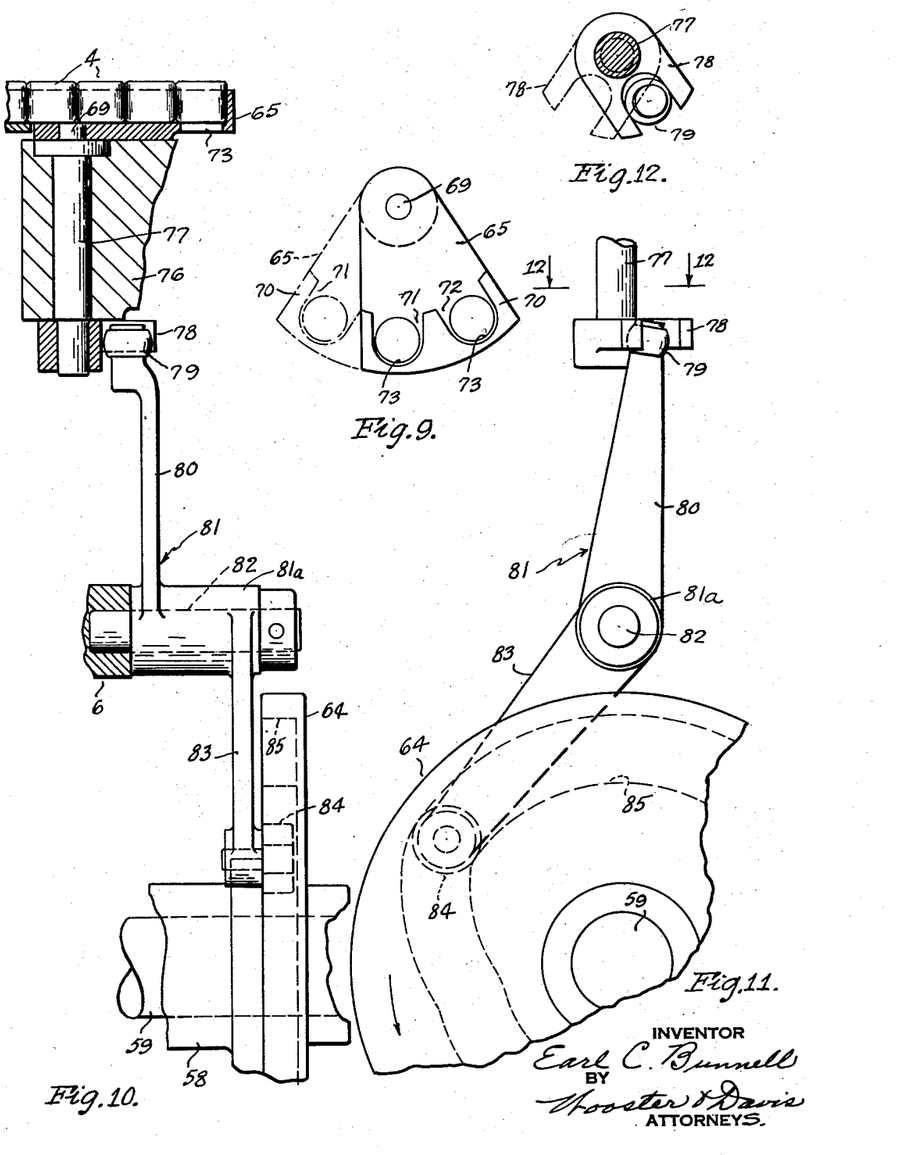
Fig. 9 is a plan view of the transfer element.
Fig. 10 is a partial side view and partial section of the means for operating this element.
Fig. 11 is a view looking from the right of Fig. 10.
Fig. 12 is a top view of the means for operating the element of Fig. 9 taken substantially on the line 12—12 of Fig. 11.

There is provided on this apparatus a chute 67 for transferring the unthreaded blanks from the forming tools of the eyelet type machine 1 to this thread-rolling device. This, as shown in Figs. 4 and 5, has a channel 68 along which the blanks 4 are fed to the transfer member 65 located at the outer or discharge end of the channel 68. This member 65 is a segmental shaped member pivoted at 69 for lateral swinging movements under the end of the chute 67, and provided with upwardly extending walls 70 on its upper side forming a pair of open sockets 71 and 72 facing the discharge end of the chute channel 68, to alternately receive the blanks 4 from this channel. The lower or bottom walls of the sockets 71 and 72 are each provided with an opening 73 for vertically movable transfer plungers 74 and 75 mounted to slide in bearings in the block 76 mounted below the member 65. The pivot 69 of the member 65 comprises a short shaft 77 mounted in this block 76, and projecting from the lower side thereof, on which projecting end is mounted a forked operating member 78 (Figs. 10, 11 and 12). Mounted in the fork of this member is a rotatable spherical member 79 mounted on the end of the arm 80 of an operating lever 81 pivotally mounted in the frame 6 by the hub 81a on a supporting stud 82. The other arm 83 of this lever carries a roller 84 running in a cam groove 85 in the cam 64 shaped to swing the upper end 79 of this lever, the forked member 78, and the transfer device 65 back and forth to bring the sockets 71 and 72 alternately in alignment with the discharge end of the channel 68 in the chute 67 and the respective mandrels 10 and 11, as will presently be described.

Figure 6:
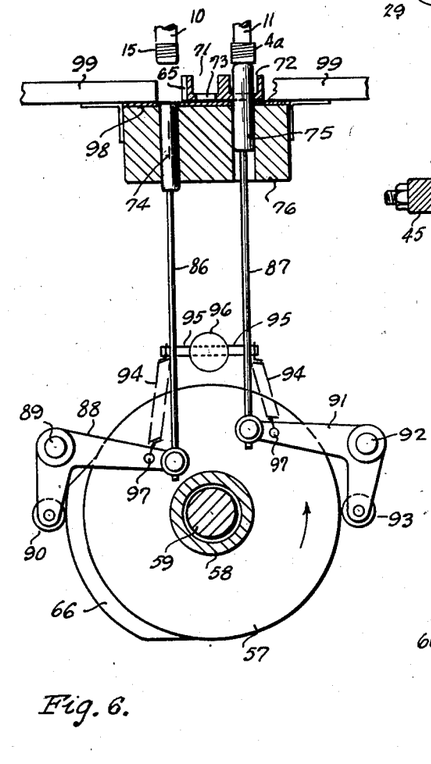
Fig. 6 is a partial vertical section showing somewhat diagrammatically the means for feeding the blanks from the transfer mechanism to the mandrels for the threading operation.

Each of the plungers 74 and 75 is mounted at the upper ends of rods 86 and 87 respectively, the rod 86 being secured at its lower end to one arm of the lever 88 pivoted to the frame 6 at 89. The other arm of this lever carries a roller 90 running on the periphery of the cam 57 for operation by the cam 66. Similarly, the rod 87 is connected to one arm of the lever 91 pivoted to the frame at 92 with its other arm carrying a roller 93 also running on the periphery of the cam 57 for operation by the cam 66. Springs 94 connected to pins 95 on a stud 96 mounted in the frame are each connected at their lower ends to one of the levers 88 and 91, as indicated at 97 (Figs. 1 and 6) to thus tend to shift the rods 86 and 87 with their plungers 74 and 75 upwardly and retain the rollers 90 and 93 against the periphery of the cam 57.

The operation is as follows: The formed blanks 4 are fed along the chute 67 from the tools of the eyelet type machine 1, either by including this chute or by suitable feed mechanism (not shown) towards this thread-rolling device mounted on the end of the frame 2 of the machine. The transfer member 65 is swung back and forth by the lever 81 and the cam 64 to bring the sockets 71 and 72 alternately into alignment with the discharge end of the channel 68 to receive the blanks from this channel. Thus, as shown in Fig. 4, the member 65 is in position with the socket 72 in alignment with the channel 68 to receive a blank 4 from this channel, while in Fig. 5 the member 65 is swung to its other position, shifting the socket 71 into alignment with the discharge end of the channel 68 to receive a blank therefrom. In the position of Fig. 4, the other socket 71 is under and in alignment with the lower end of the mandrel 10, while with the member 65 in the position of Fig. 5, the socket 72 is under and in alignment with the lower end of the mandrel 11. With member 65 in the position of Fig. 5, the plunger 75 is operated by its spring 94 to shift it upwardly through the opening 73 in the bottom of the socket 72 to push the blank 4 in the socket upwardly onto the lower threaded end of the mandrel 11, as shown in Fig.

Figure 7:
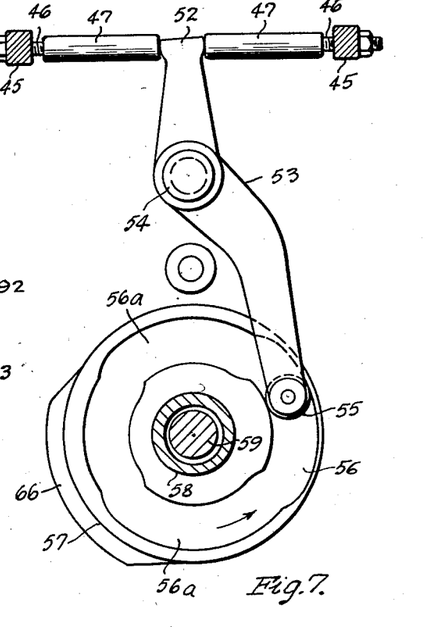
Fig. 7 is a partial side view and partial section of the means for operating the transfer mechanism.
Figure 8:
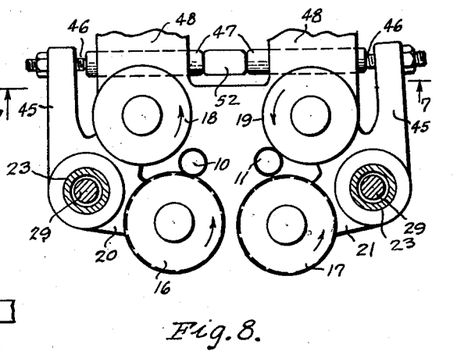
Fig. 8 is a plan view showing diagrammatically the arrangement of the thread rolling and threaded shell removing wheels.

6. Then the cam 56 operating through the lever 53 and the sliding pins 47 shifts the bracket 21 to press the threaded wheel 17 against the shell blank on the mandrel 11, as shown in Fig. 5, thus rolling a screw thread in the wall of this blank while it is held on the mandrel by the plunger 75. After this thread is formed on the shell blank, the cam 66 operating against the roller 93 shifts the plunger 75 downwardly to a position below the transfer member 65, and then the cam lever 81 is operated to swing the member 65 from the position of Fig. 5 to the position of Fig. 4. Then the cam lever 53 is operated to permit the bracket 21 to be operated to shift the threaded roller 17 away from the threaded shell 4a on the mandrel 11 and carry the friction roller 19 into engagement with this threaded shell on the mandrel. This will rotate the shell and unscrew it from the mandrel, so that it will drop onto the plate 98 under the member 65 and between the entrance ends of the discharge chutes 99. Shifting the transfer member 65 from the position of Figs. 5 and 6 to the position of Fig. 4 has carried another blank 4 received from the chute channel 68 to a position under the lower end of the mandrel 10, and in this position the plunger 74 is shifted by its spring 94 to carry the blank upwardly and place it on the lower end of the mandrel 10. Then the lever 53 is operated by its cam 56 to shift the threaded wheel 16 into engagement with the shell blank on the mandrel 10 to roll the thread in this blank, the same as described in connection with the blank on the mandrel 11. After this the plunger 74 is again lowered by the cam 66 and the transfer member 65 again shifted from the position of Fig. 4 to the position of Fig. 5. Then the cam-operated lever 53 permits shifting of the bracket 20 to shift threaded roller 16 away from the threaded shell and bring the friction roll 18 against this shell on the mandrel 10 to unscrew this shell from the mandrel and permit it to drop onto the plate 98 in front of its discharge chute 99. This plate has openings for passage of the plungers 74 and 75. As the member 65 is shifted from the position of Fig. 4 to the position of Fig. 5, its outer wall will push the previously threaded shell removed from the mandrel 11 into its discharge chute 99, and similarly on its reverse movement will push the shell removed from the mandrel 10 into its discharge chute. Referring to Fig. 7, the cam groove 56 is provided with dwells 56a to position the brackets 20 and 21 with the wheels carried thereby in a neutral position during operation of the transfer device 65 and the plungers 74 and 75. Thus it will be seen that blank or unthreaded shells are alternately received from the chute 67 by the transfer member 65, and each alternate blank received from this chute is positioned under the respective mandrels 10 and 11, where they are shifted from the members 65 alternately onto the mandrels 10 and 11 by the plungers 74 and 75, and while on the mandrels the thread is formed by the threaded rollers 16 and 17 brought alternately into engagement with the shell blanks on the respective mandrels 10 and 11, and then shifted to alternately bring the friction rollers 18 and 19 into engagement with the threaded shells on the mandrels to unscrew them from these mandrels, to permit them to drop therefrom to a position where they are shifted by alternate movements of the member 65 into the discharge chutes 99. Thus, while the thread is being rolled on a blank on one mandrel, the threaded shell is being removed from the other mandrel, and so on alternately throughout the operation, which materially increases the speed of producing the finished shells.

Having thus set forth the nature of my invention, I claim:

1. In apparatus for forming threads in sheet metal shells, a pair of threaded mandrels, a threaded wheel opposite each mandrel, means for rotating the mandrels and said wheels, a feed mechanism for the shells to be threaded including a support for the shells movable to alignment with each of the mandrels, means for feeding the shells to said support, means for shifting the support to alternately bring a shell carried thereby into alignment with the respective mandrels, means for transferring the shells from the support to the respective mandrels when in alignment therewith, means pressing the threaded wheels alternately against the shells on the mandrels to form a thread therein, and means for removing the threaded shells from the mandrels.

2. In apparatus for forming screw threads in sheet metal shells, a pair of threaded mandrels, driving means for rotating the mandrels, means for forming screw threads in shells on the mandrels comprising a threaded wheel and a friction wheel associated with each mandrel, means for driving the wheels, a single feeding means for feeding unthreaded shells alternately to the respective mandrels, and control means operable to shift the threaded wheels alternately to press them against the shell on the adjacent mandrel and then to shift the threaded wheel away from the threaded shell and shift the associated friction wheel into engagement with this shell to unscrew it from the mandrel.

3. In apparatus for forming screw threads in sheet metal shells, a pair of threaded mandrels, driving means for rotating the mandrels, means for feeding unthreaded shells to the mandrels, means for forming screw threads in shells on the mandrels comprising a threaded wheel and a friction wheel associated with each mandrel, means driving the threaded wheels in a direction to roll a screw thread in a shell on its associated mandrel, means driving each friction wheel in a direction to unscrew a threaded shell from its associated mandrel when in engagement with said shell, a single support for the threaded and friction wheels associated with each mandrel, and control means for shifting the supports to press the threaded wheels alternately against the shells on the adjacent mandrels to roll a thread therein and then to shift the supports to carry the threaded wheels away from the threaded shell on the mandrel, and shift the friction wheels into engagement with these shells to unscrew them from the mandrels.

4. In apparatus for forming screw threads in sheet metal shells, a pair of mandrels each threaded at one end to correspond with the thread to be formed in a shell, means for feeding unthreaded shells to the mandrels comprising a chute having an exit end, a transfer member at the exit end of the chute provided with a pair of open-sided recesses, means mounting the transfer member for movement to place the recesses alternately in alignment with the chute to receive unthreaded shells therefrom and shifting them into alignment with the mandrels, means for shifting the shells from the transfer member to the aligned mandrel, a pivoted support adjacent each mandrel, a pair of shafts on each support, a threaded wheel on one shaft and a friction wheel on the other shaft of each support, a drive shaft, a driving connection from the drive shaft to each mandrel for rotating it and driving connections from the drive shaft to the wheel shafts for driving the wheels, and control means for shifting the supports on their pivots to press the threaded wheels alternately against the shells on the mandrels to roll a screw thread therein and then shift the threaded wheel away from the threaded shell and bring the associated friction wheel against this shell to unscrew it from the mandrel.

5. The apparatus for forming screw threads in sheet metal shells according to claim 4 in which there is a cam shaft, a series of cams on said shaft, operative connections from the cams to the transfer member, the means for shifting the shells from the transfer member to the mandrels, and the means for shifting the threaded and friction wheels to and from engagement with the shells on the mandrels in certain timed relation with each other, and driving means for the cam shaft.

6. In an apparatus for forming screw threads in sheet metal shells, a pair of upright spindles, driving means for the spindles, mandrels on the lower ends of the spindles provided with threads corresponding with the threads to be formed in the shells, a feeding means for the shells comprising a chute having a discharge end and a transfer member provided with open-sided recesses to receive shells from said chute, means for shifting the transfer member to shift its recesses alternately from alignment with the chute to alignment with the mandrels, the bottom walls of the recesses in the transfer member being provided with openings therethrough, a vertically movable plunger below and in alignment with each mandrel, means for shifting the plungers alternately through said openings to carry an aligned shell from the transfer member to the mandrels, and means for rolling a thread in the shells on the mandrels and unscrewing the threaded shells therefrom.

7. In an apparatus for forming screw threads in sheet metal shells, a pair of upright spindles, driving means for the spindles, mandrels on the lower ends of the spindles provided with threads corresponding with the threads to be formed in the shells, feeding means for placing an unthreaded shell alternately on each mandrel, and means for rolling a thread in the shells on the mandrels and unscrewing the threaded shells therefrom comprising a movable support adjacent each mandrel, a threaded wheel and a friction wheel on each support, drive means for the wheels, and control means for shifting each support to alternately carry the wheels to and from the mandrels to press the threaded wheel against the shell on the mandrel to roll a thread therein and then press the friction wheel against the threaded shell to unscrew it from the mandrel.

8. In apparatus for forming screw threads in sheet metal shells, a pair of upright spindles, drive means for the spindles, mandrels on the lower ends of the spindles provided with screw threads corresponding with those to be formed in the shells, means for feeding unthreaded shells to the mandrels comprising a feed chute and a pivoted transfer member provided with a pair of recesses to receive unthreaded shells from the chute, means for shifting the transfer member to bring the shells in the recesses alternately into alignment with the mandrels, plungers below and in alignment with each mandrel, cam means for operating the plungers alternately to shift the shells from the transfer member to the mandrels, means for rolling a thread in the shells and the mandrels and removing the threaded shells therefrom comprising a threaded wheel and a friction wheel associated with each mandrel, drive means for the wheels, and cam means for first pressing the threaded wheel against the shell to roll a thread therein and then press the friction wheel against the threaded shell to unscrew it from the mandrel.

9. In apparatus for forming screw threads in sheet metal shells, a pair of upright spindles having screw threaded mandrels at their lower ends, drive means for the spindles, feed means for placing unthreaded shells on the mandrels, and means for threading the shells on the mandrels and removing them therefrom comprising a movable support adjacent each mandrel, a threaded wheel and a friction wheel mounted on each support, drive means for the wheels, and cam means for shifting the supports to alternately press the threaded wheel against the shell on the associated mandrel to roll a thread therein and then shift the threaded wheel from the shell and press the friction wheel against the threaded shell to unscrew it from the mandrel.

10. In an apparatus for forming screw threads in sheet metal shells, a rotatable mandrel threaded to correspond with the thread to be formed in the shell, driving means for rotating the mandrel, feeding means for placing an unthreaded shell on the mandrel, a movable support, a wheel threaded on its periphery similar to that of the mandrel and a friction wheel mounted on the support, driving means for the wheels, and control means for shifting the support to press the threaded wheel against the shell on the mandrel to roll a thread therein and then shift the support to move the threaded wheel away from the shell and press the friction wheel against the threaded shell to unscrew it from the mandrel.

References Cited in the file of this patent

UNITED STATES PATENTS

| | | |
|---|---|---|
| 479,173 | Parker | July 19, 1892 |
| 1,747,040 | Akeroyd | Feb. 11, 1930 |
| 2,054,182 | Unke | Sept. 15, 1936 |
| 2,526,900 | Remington | Oct. 24, 1950 |